United States Patent

Jones et al.

[11] 3,962,996
[45] June 15, 1976

[54] FEEDING TROUGH

[75] Inventors: Robert D. Jones; Jerry L. Hall, both of Oskaloosa, Iowa

[73] Assignee: Intraco, Inc., Oskaloosa, Iowa

[22] Filed: Apr. 7, 1975

[21] Appl. No.: 565,859

[52] U.S. Cl. .............................. 119/51 CF; 119/61
[51] Int. Cl.² .................... A01K 5/00; A01K 39/00
[58] Field of Search ........ 119/52 AF, 18, 61, 51 CF

[56] References Cited
UNITED STATES PATENTS

| | | | |
|---|---|---|---|
| 2,918,037 | 12/1959 | Polley | 119/52 AF |
| 3,199,493 | 8/1965 | Hart | 119/52 AF |
| 3,543,283 | 11/1970 | Cataline | 119/61 |
| 3,776,191 | 12/1973 | Murto | 119/18 |

*Primary Examiner*—Hugh R. Chamblee
*Attorney, Agent, or Firm*—Henderson, Strom & Sturm

[57] ABSTRACT

Feed distributing apparatus of the type including conveying means which supplies feed to a feeding trough. The feeding trough is of one piece construction and includes an elongated bottom wall, a first substantially upright wall connected to one side of the bottom wall, a second substantially upright wall connected to the other side of the bottom wall and an intermediate wall connected to the bottom wall and extending substantially upwardly between the sides of the bottom wall. A conveyor is disposed between the intermediate wall and one of the upright walls. Openings are disposed in the intermediate wall for allowing feed to pass from the conveyor structure, through the openings and to the trough.

2 Claims, 5 Drawing Figures

U.S. Patent   June 15, 1976   3,962,996
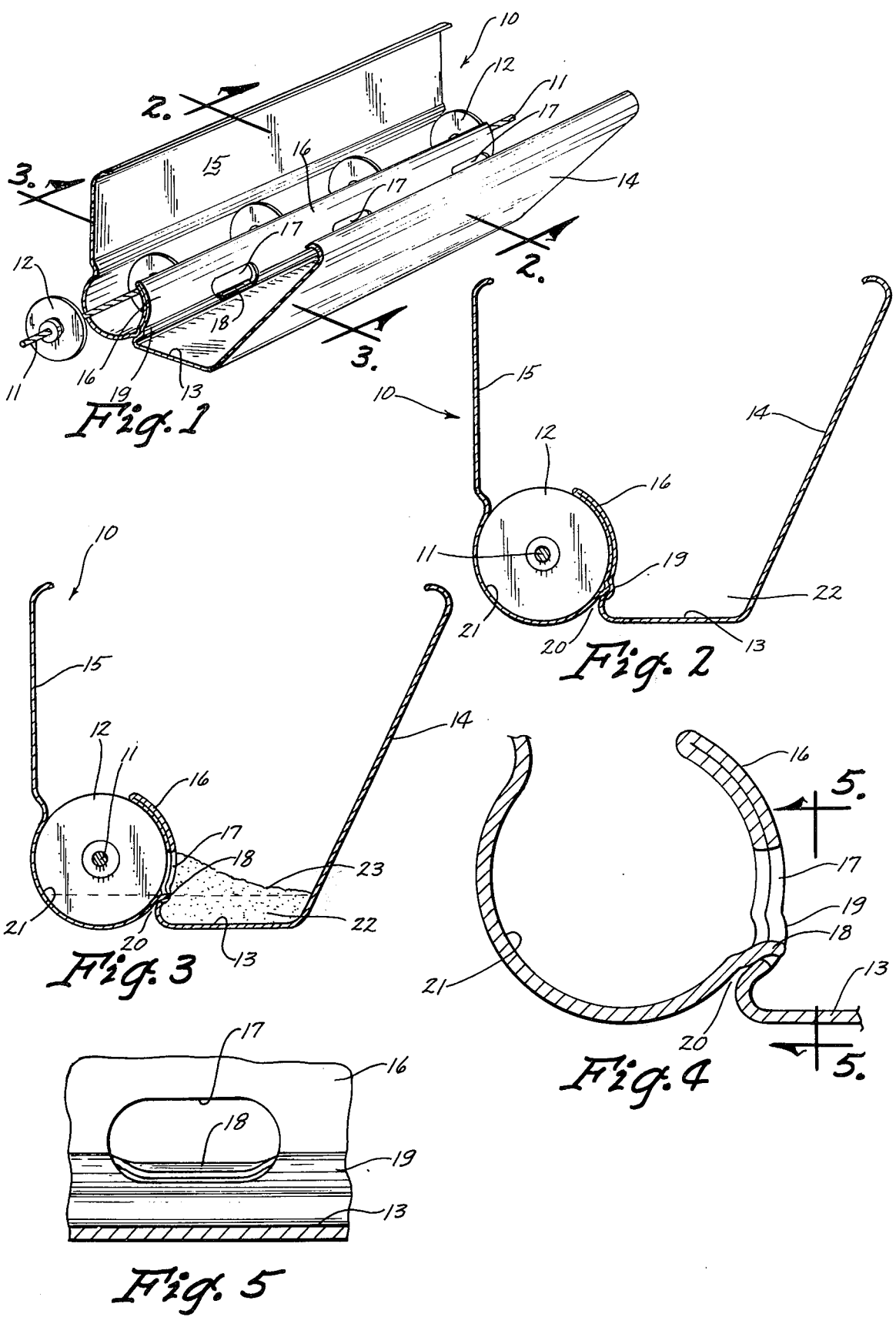

3,962,996

FEEDING TROUGH

BACKGROUND OF THE INVENTION

The present invention relates generally to a feeding apparatus, and more particularly to a poultry feeding apparatus for use in conjunction with a feed conveyor.

In many poultry operations, it is the general practice to keep the birds in cages. The cages are normally arranged in long rows throughout the poultry house. In such installations, it is, of course, necessary to deliver food to the birds in the cages. One of the most successful and efficient systems for achieving this desired result has been by the use of tubes having elongated cable members which pass longitudinally through the tubes and pull the feed along with it. Such a system is shown generally in U.S. Pat. No. 2,918,037.

One of the first ways in which poultry was fed from the above mentioned conveyor systems is shown in FIG. 7 of U.S. Pat. No. 2,738,766, which shows a cable conveyor system which merely has the top thereof removed so that the poultry can have direct access to the feed within the tube and around the conveying member. It has been found, however, that if such a feeder system is used and the poultry are allowed to have direct access thereto at a time when the conveyor is in operation, that the beaks of the poultry can be easily damaged by the movement of the conveyor, and that the beaks of poultry can easily be pulled off of the bird if the bird is feeding at the end of a trough and the beak becomes caught between the conveyor member and the discharge tube, as shown in FIG. 8 of U.S. Pat. No. 2,738,766. Because of this problem, guards have been devised for poultry feeding troughs which prevent the birds from getting their beaks into the conveyor structure. Such a guard is shown in U.S. Pat. No. 2,827,877.

Another problem recognized generally in the prior art is the one of delivering a uniform quantity of feed for each bird within the poultry installation. For example, U.S. Pat. No. 3,776,191 discloses a poultry feeding apparatus which has a feature for adjusting the level of the conveyor tube with respect to the feeding trough in order to prevent the birds at the beginning of the conveyor system from receiving more feed than the birds at the end of the conveyor system.

It can therefore be seen that there is a need for a feeding apparatus which is very simple and which has a minimum of moving parts or adjustments that are necessarily associated therewith. It is desirable for example, to make a feeding trough and conveyor tube of one piece construction. There is also a need to hold the production and material costs down as much as possible for the production of a feeding trough and to provide a structure which maintains a low level of feed in a feeding trough so that the feed is not wasted.

SUMMARY OF THE INVENTION

The present invention relates to a feeding trough for use in conjunction with a feed conveying system. The present invention has a feeding trough which is not elevated so much from the feeding trough that flow continues at all times, but rather one which has a feeding trough which will not distribute excess material once a desired amount has been delivered. A one piece trough and conveyor tube structure is provided which has a bottom wall with two outside upstanding walls and an intermediate upstanding wall having openings therethrough. An elongated crease structure causes a lip to be formed through each of the openings so as to prevent feed from being wasted.

An object of the present invention is to provide a feeding trough which will deliver uniform quantities of feed for each bird in a poultry installation.

Another object of the invention is to provide a conveyor support and feeding trough of a one piece construction.

A further object of the invention is to provide a poultry feeding apparatus which maintains a low level of feed in a poultry feeding trough.

Still another object of the invention is to provide a poultry feeding trough in conjunction with a movable conveyor member, which is safe for use with poultry so that the beaks of the poultry are not damaged or removed.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of the present invention having a conveying cable disposed therein;

FIG. 2 is a cross-sectional view of the present invention taken along the lines 2—2 of FIG. 1;

FIG. 3 is a cross-sectional view, like FIG. 2, but taken along line 3—3 of FIG. 1;

FIG. 4 is an enlarged partial cross-sectional view of the opening shown in FIG. 3; and FIG. 5 is a partial cross-sectional view taken along line 5—5 of FIG. 4.

DESCRIPTION OF THE PREFERRED EMBODIMENT

Referring now to the drawings wherein like reference numerals designate identical or corresponding parts throughout the several views, FIG. 1 shows the feeding trough 10 of the present invention having a cable conveyor 11 disposed therein. The cable conveyor 11 has a series of equi-distantly spaced plastic discs 12 secured thereto.

The feeding trough 10 has a bottom wall 13. A first upstanding wall 14 is connected to one side of the bottom wall 13 and a second upstanding wall 15 is attached to the other side of the bottom wall 13. An intermediate wall 16 is secured to the bottom wall 13 and has a series of openings 17 disposed therein.

The intermediate wall 16 is of a double thickness because of the manner in which it has been formed, as will be discussed below. The opening 17 has a lip 18 on the bottom side thereof as can clearly be seen in FIGS. 3 – 5. A longitudinally extending crease 19 is formed continuously along the intermediate wall 16.

The formation of the feeding trough structure 10 is made by initially beginning with a flat piece of sheet metal such as steel, and punching the holes 17 therein. The bending of the sheet steel is then done, as is well known in the art, to thereby produce the cross-sectional structure as shown for example in FIG. 2. The presence of the crease 19 is particularly significant because it is the formation of this crease 19 which causes the lip 18 to protrude through the opening 17. If it were not for the lip 18, a space would exist at point 20, and this would allow feed to pass through the space 20 and be wasted as such feed passes from the chamber 21 of the elongated conveyor member 11 to the feed through chamber 22.

It is important to appreciate the fact that the chamber 21 of the elongated conveying member is not elevated appreciably from the feeding chamber 22. Because of this fact and the particular relationship between the opening 17 and the other structure of this invention, feed passing through the chamber 21 will be deposited in the feeding chamber 22 only to the point as indicated in FIG. 3 by the numeral 23 which indicates the top of the feed level. Once this feed level is achieved, no appreciable amount of feed will pass through the opening 17 because of the presence of the pile of feed 23 in the receiving chamber 22. Because of this particular structure, a very uniform distribution of feed can be achieved throughout the entire system so that some of the birds do not receive more feed grain than others.

It is important to note that the poultry using this invention would always be feeding from the left side of the feeding trough 10 as shown in FIGS. 2 and 3, for example. This is important because if they are on the left side, then they would not be able to position their beaks so that they would be in contact with the discs 12 on the elongated conveying member 11. This is an important safety factor for the reasons outlined above.

Accordingly, it is believed to be clear that all of the objects referred to above are indeed accomplished by the illustrated preferred embodiment. Obviously many modifications and variations of the present invention are possible in light of the above teachings. It is therefore to be understood that, within the scope of the appended claims, the invention may be practiced otherwise than as specifically described.

I claim:

1. A feeder trough comprising:
   an elongated bottom wall;
   a first substantially upright wall connected to one side of said bottom wall;
   a second substantially upright wall connected to the other side of said bottom wall;
   an intermediate wall connected to said bottom wall and extending substantially upwardly intermediate the sides of said bottom wall, said intermediate wall being comprised of a double thickness of material and having at least one opening therethrough;
   a space being formed between said second wall and said intermediate wall, said space being adapted to receive an elongated conveyor member; and
   a lip being disposed on one of the thicknesses of said intermediate wall adjacent the bottom of said opening, said lip overlying the other thickness of said intermediate wall and extending substantially through said opening to prevent feed from dropping between the double thickness of said intermediate wall.

2. A feeder trough comprising:
   an elongated bottom wall;
   a first substantially upright wall connected to one side of said bottom wall;
   a second substantially upright wall connected to the other side of said bottom wall;
   an intermediate wall connected to said bottom wall and extending substantially upwardly intermediate the sides of said bottom wall, said intermediate wall having a plurality of openings therethrough;
   a space being formed between said second wall and said intermediate wall, said space being adapted to receive an elongated conveyor member, the bottom of said space being substantially coincident to said bottom wall;
   said feeder trough being of one piece sheet metal material construction and said intermediate wall being constructed of a double thickness of said material; and
   said intermediate wall having a longitudinally extending crease thereon for holding said double thickness of material together, said crease being substantially aligned with the lowest level of said opening.

* * * * *